US008258922B2

(12) United States Patent
Shu et al.

(10) Patent No.: US 8,258,922 B2
(45) Date of Patent: Sep. 4, 2012

(54) ELECTRONIC DEVICE WITH REMOTE CONTROL FUNCTION

(75) Inventors: Wen Shu, Shenzhen (CN); Ching-Chih Lin, Taipei Hsien (TW); Te-Hua Lee, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 225 days.

(21) Appl. No.: 12/792,679

(22) Filed: Jun. 2, 2010

(65) Prior Publication Data

US 2011/0057768 A1 Mar. 10, 2011

(30) Foreign Application Priority Data

Sep. 10, 2009 (CN) .......................... 2009 1 0306824

(51) Int. Cl.

| | |
|---|---|
| ***G08B 5/22*** | (2006.01) |
| ***G08B 1/08*** | (2006.01) |
| ***H04Q 5/22*** | (2006.01) |
| ***H04B 1/16*** | (2006.01) |

(52) U.S. Cl. ..................... 340/7.33; 340/7.32; 340/7.36; 340/539.3; 340/10.34; 455/343.2; 455/343.3

(58) Field of Classification Search ................. 340/7.32, 340/7.36, 539.3, 10.34, 7.33; 455/343.2, 455/343.3
See application file for complete search history.

(56) References Cited

U.S. PATENT DOCUMENTS

| | | | | |
|---|---|---|---|---|
| 5,761,617 | A * | 6/1998 | Yonekura et al. | 340/7.32 |
| 6,920,342 | B2 * | 7/2005 | Reiner | 455/574 |
| 7,437,132 | B2 * | 10/2008 | Hanabusa et al. | 455/130 |

* cited by examiner

*Primary Examiner* — Brian Zimmerman
*Assistant Examiner* — Laura Nguyen
(74) *Attorney, Agent, or Firm* — Altis Law Group, Inc.

(57) ABSTRACT

A receiving module, checking module, and a controller are provided. The receiving module is configured for receiving external wireless signals. The checking module is configured for checking whether a current wireless signal comprises checking codes of a control signal which is configured for controlling the electronic device and, if yes, generating an activation signal. The controller is configured for switching the electronic device into a power-saving mode if no external wireless signal is received after a predetermined time period and switching the electronic device into a normal mode if the activation signal is received.

3 Claims, 2 Drawing Sheets

ELECTRONIC DEVICE WITH REMOTE CONTROL FUNCTION

BACKGROUND

1. Technical Field

The present disclosure relates to electronic devices and, particularly, to an electronic device that can be controlled remotely.

2. Description of Related Art

Some electronic devices have remote control functions. To save power, such an electronic device often can work in a standby mode in which only a signal receiving module thereof is activated (thus consuming less power) for detecting incoming control signals and then all modules thereof are activated for normal working operations. However, it is not uncommon that the electronic devices can be activated by some random or unauthorized control signals, thus reducing the power efficiency of these electronic devices having this standby feature.

Therefore, it is desirable to provide an electronic device, which can overcome the above-mentioned limitations.

BRIEF DESCRIPTION OF THE DRAWINGS

Many aspects of the present electronic device should be better understood with reference to the following drawings. The components in the drawings are not necessarily drawn to scale, the emphasis instead being placed upon clearly illustrating the principles of the present electronic device. Moreover, in the drawings, like reference numerals designate corresponding parts throughout the several views.

DETAILED DESCRIPTION

Embodiments of the present electronic device will now be described in detail with reference to the drawings.

Figure 1:
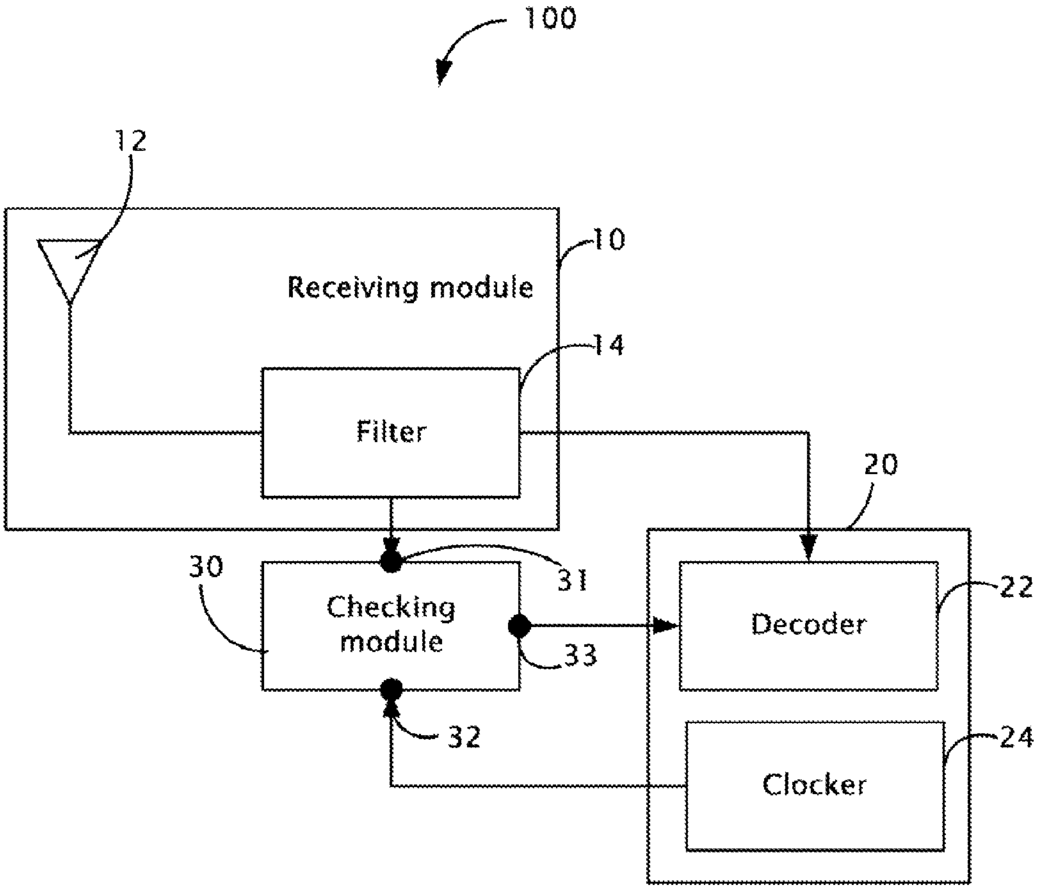
FIG. 1 is a block diagram of an electronic device, according to one embodiment.

Referring to FIG. 1, an electronic device 100, according to an embodiment, can be remotely controlled by a wireless control signal. The control signal can be a radio frequency (RF) signal and includes a number of sequential codes (e.g., RF pulses). Some of the codes of the control signal function as checking codes. Thus, the electronic device 100 can check if an incoming wireless signal is an authorized control signal or not by checking the checking codes (see below). In this embodiment, the checking codes of the control signal are the first three codes of the control signal. The electronic device 100 includes a receiving module 10, a controller 20, and a checking module 30.

The receiving module 10 is configured for receiving external wireless signals. In this embodiment, the receiving module 10 includes an antenna 12 and a filter 14. The antenna 12 is configured for receiving the wireless signals. The filter 14 is configured for filtering the wireless signals to remove noise.

The controller 20 is connected to the receiving module 10 and configured for processing the control signal and controlling the electronic device 100 to perform various functions according to the control signal. The controller 20 includes a clocker 22 and a decoder 24. The clocker 22 is configured for generating timing signals and sending the generated timing signals to the checking module 30. The decoder 24 is configured for decoding the control signal and sending the decoded control signal to back-end components (not shown) of the electronic device 100 for further processing or controlling. The controller 20 can control the electronic device 100 to work in a standby mode and a normal mode. In the standby mode, the decoder 24 and the back-end components of the electronic device 100 are deactivated and thus the electronic device 100 consumes less power. In the normal mode, the decoder 24 and the back-end components of the electronic device 100 are activated for normal working operations and thus the controller 20 consumes more power. The controller 20 is programmed to switch the electronic device 100 into the standby mode if no external signal is received by the receiving module 10 after a predetermined time period. The controller 20 switches the electronic device 100 into the normal mode when an activation signal is received.

The checking module 30 includes a first terminal 31, a second terminal 32, and a third terminal 33. The first terminal 31 is connected to the receiving module 10 for receiving the wireless signals. The second terminal 32 is connected to the clocker 22 for receiving timing signals. The third terminal 33 is connected to the decoder 24. The checking module 30 is configured for checking if the check codes of a current wireless signal match predetermined values and, if yes, generates the activation signal.

The activation signal is transmitted to the decoder 24 via the third terminal 33 to activate the controller 20. It is assumed that if the first three codes of the current wireless signal are all logic high levels "111", the current wireless signal is the control signal and the activation signal is generated.

Figure 2:
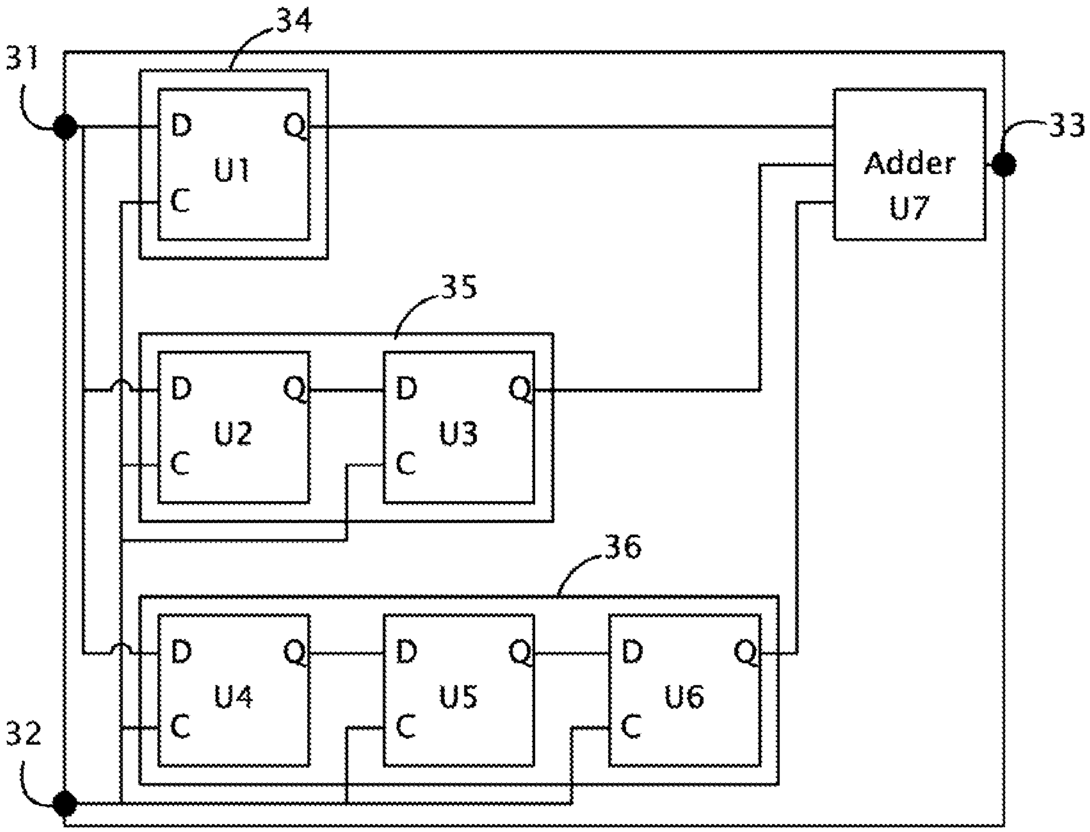
FIG. 2 is a block diagram of a checking module of the electronic device of FIG. 1.

Referring to FIG. 2, the checking module 30 includes a first circuit 34, a second circuit 35, a third circuit 36, and an adder U7. The first circuit 34 includes a first register U1. The second circuit 35 includes a second register U2 and a third register U3. The third circuit 36 includes a fourth register U4, a fifth register U5, and a sixth register U6. Each of the registers U1~U6 includes an input terminal D, a clocking terminal C, and an output terminal Q. In this embodiment, all the registers U1~U6 are D-type.

The input terminals D of the register U1, U2, and U4 are connected to the first terminal 31. The output terminal Q of the second register U2 is connected to the input terminal D of the third register U3. The output terminal Q of the fourth register U4 is connected to the input terminal D of the fifth register U5. The output terminal Q of the fifth register U5 is connected to the input terminal D of the sixth register U6. The clocking terminals C of the registers U1~U6 are connected to the second terminal 32. The output terminal Q of the registers U1, U3, and U6 are connected to input ends of the adder U7. The output end of the adder U7 is connected to the third terminal 33.

Thus, the checking module 30 sequentially samples codes of the current wireless signal and only when the first three codes of the current wireless signal turn out to be three high logic levels "111", the output end of the adder U7 (i.e., the third terminal 33) outputs a high logic level "1" as the activation signal.

The checking module 30 is not limited to this embodiment but should be changed according to the structure of the checking codes of the control signal. For example, if the checking codes of the control signal only include the first code, then the circuits 35 and 36 can be omitted. If the check codes of the control signal only include the first two codes, then the third circuit 36 can be omitted. In all, if the checking codes of the control signal include the first n codes (n is a positive integer)

the checking module needs to employ n circuits, wherein the i-th circuit includes i serially connected registers (i is a positive integer and $i \leqq n$).

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. An electronic device comprising:

a receiving module for receiving external wireless signals;

a checking module configured for checking if a current wireless signal comprises checking codes of a control signal which is configured for controlling the electronic device and, if yes, generating an activation signal; and a controller configured for switching the electronic device into a power-saving mode if no external wireless signal is received after a predetermined time period and switching the electronic device into a normal mode if the activation signal is received;

wherein the checking module comprises a first terminal, a second terminal, and a third terminal, the controller comprising a clocker for generating timing signals; the first terminal being connected to the receiving module for receiving the external wireless signals; the second terminal being connected to the clocker for receiving the timing signals; the checking module being configured for sequentially sampling codes of the current wireless signal upon receiving each of the timing signals; the third terminal being connected to the controller and configured for outputting the activation signal to the controller, wherein the checking codes of the control signal comprises first n codes; the checking module comprises n corresponding circuits and an adder, wherein n is an integer, the i-th circuit comprises i D-type registers, i is a positive integer, and $i \leqq n$; each D-type register comprising an input terminal, a clocking terminal, and an output terminal; wherein the registers of the same circuit are serially connected between the first terminal and the adder via the input terminals and the output terminals thereof, the clocking terminals are connected to the second terminal, and the adder is connected to the third terminal.

2. The electronic device of claim 1, wherein the receiving module comprises an antenna and a filter; the antenna being configured for receiving the external wireless signals; the filter being configured for filtering the external wireless signals to remove noises.

3. The electronic device of claim 1, wherein the controller comprises a decoder for decoding the control signal; the third terminal being connected to the decoder.

* * * * *